(12) United States Patent
Jalkanen et al.

(10) Patent No.: US 12,472,235 B2
(45) Date of Patent: *Nov. 18, 2025

(54) TREATMENT OF DISEASES WITH SEQUENTIAL ADMINISTRATION OF AN AGENT CAPABLE OF UP-REGULATING CD73 AND GLUCOCORTICOIDS

(71) Applicant: FARON PHARMACEUTICALS OY, Turku (FI)

(72) Inventors: Juho Jalkanen, Mietoinen (FI); Alexander Spicer, Turku (FI)

(73) Assignee: FARON PHARMACEUTICALS OY, Turku (FI)

( * ) Notice: Subject to any disclaimer, the term of this patent is extended or adjusted under 35 U.S.C. 154(b) by 320 days.

This patent is subject to a terminal disclaimer.

(21) Appl. No.: 17/582,639

(22) Filed: Jan. 24, 2022

(65) Prior Publication Data

US 2022/0233644 A1 Jul. 28, 2022

(30) Foreign Application Priority Data

Jan. 25, 2021 (FI) ..................................... 20215080

(51) Int. Cl.
| | | |
|---|---|---|
| A61K 39/00 | (2006.01) | |
| A61K 31/573 | (2006.01) | |
| A61K 38/21 | (2006.01) | |
| A61P 37/06 | (2006.01) | |

(52) U.S. Cl.
CPC .......... *A61K 38/215* (2013.01); *A61K 31/573* (2013.01); *A61K 38/212* (2013.01); *A61P 37/06* (2018.01)

(58) Field of Classification Search
None
See application file for complete search history.

(56) References Cited

U.S. PATENT DOCUMENTS

| 11,421,279 B2* | 8/2022 | Jalkanen ............... C12Q 1/6883 |
| 2013/0217033 A1 | 8/2013 | Jalkanen et al. |
| 2017/0246254 A1 | 8/2017 | Jalkanen et al. |
| 2020/0199677 A1 | 6/2020 | Jalkanen et al. |

FOREIGN PATENT DOCUMENTS

| WO | 2007042602 A1 | 4/2007 |
| WO | 2020115368 A1 | 6/2020 |

OTHER PUBLICATIONS

Mammen MJ, Aryal K, Alhazzani W, et al. Interferon beta-1a for patients with moderate to severe acute respiratory distress syndrome: a systematic review and meta-analysis of randomized trials. Pol Arch Intern Med. 2020; 130: 287-296. doi:10.20452/pamw. 15279 (Year: 2020).*

Hu et al. CD73: Friend or Foe in Lung Injury. Int J Mo Sci. 2023, 24(6):5545 (Year: 2023).*
BioSpace. Faron Pharmaceuticals Ltd—Interest trial update presented at ESICM. Oct. 22, 2018, pp. 1-9 (Year: 2018).*
Faron Pharmaceuticals Limited. Faron's follow-up investigations may breathe new life into Traumakine development. Oct. 2018, pp. 1-2 (Year: 2018).*
Vandewalle et al. Glucocorticoids in Sepsis: To Be or Not to Be. Frontiers in Immunology, 2020, 11:1-14. (Year: 2020).*
Clinical Trials Arena. Faron says treatment forARDS shows no improvementversus placebo. pp. 1-3, (Apr. 30, 2019). (Year: 2019).*
Faron Pharmaceuticals Oy: Final results from YODA study confirm previously reported findings. Jun. 14, 2019 (Year: 2019).*
Jalkanen Juho et al., "Interferon beta-1a for COVID-19: critical importance of the administration route", Critical Care, vol. 24, No. 1, Dec. 1, 2020, 3 pages.
NCT03119701: "Efficacy and Safety of FP-1201-lyo (Interferon Beta-1a) in Prevention of Multi-Organ Failure on Patients After Open Surgery for a RAAA ( INFORAAA)", Apr. 19, 2017, Retrieved from the Internet: URL: https://clinicaltrials.gov/ct2/show/NC, 10 pages.
Jalkanen Juho et al., "Glucocorticoids inhibit type I Ifn beta signaling and the upregulation of CD73 in human lung", Intensive Care Medicine, Springer Berlin Heidelberg, Berlin/Heidelberg, vol. 46, No. 10, May 19, 2020, pp. 1937-1940.
International Search Report issued in PCT/FI2022/050044 dated Apr. 25, 2022, 5 pages.
Jalkanen et al., "Glucocorticoids inhibit type I IFN beta signaling and the upregulation of CD73 in human lung" Intensive Care Med, (2020) 46:pp. 1937-1940.
Jalkanen et al., "Interferon beta-1a for COVID-19: critical importance of the admistration route", Critical Care, (2020), 24: 335 3 pages.
Loutfy et al., Interferon alfacon-1 plus conticosteroids in severe acute respitory syndrome, JAMA, Dec. 24-31, 2003, vol. 290, No. 24, pp. 3222-3228.
Hassan et al., "Dexamethasone in severe COVID-19 infection: A case series In respiratory medicine", Respiratory Medicine Case Reports 31 (2020) 101205, 5 pages.
Abdolahi et al., "Letter to the editor: efficacy of different methods of combination regimen administrations including dexamethasone, intravenous immunoglobulin, and interferon-beta to treat critically ill COVID-19 patients: a structured summary of a study protocol for a randomized controlled trial", Trials, (2020) 21: 549, 5 pages.
Flammer et al., "The type I interferon signaling pathway is a target for glucocorticoid inhibition", Mol Cell Biol 30, 4564-4574 (2010).
Sterne et al., "Association Between Administration of Systemic Corticosteroids and Mortality Among Critically Ill Patients With COVID-19, A Meta-analysis", JAMA, 2020; 324(13), pp. 1330-1341.

(Continued)

*Primary Examiner* — Maher M Haddad
(74) *Attorney, Agent, or Firm* — ROTHWELL, FIGG, ERNST & MANBECK, P.C.

(57) ABSTRACT

A method for preventing and/or treating systemic inflammatory response syndrome (SIRS), the method comprising administration of an agent capable of up-regulating CD73 in combination with a glucocorticoid and/or an agent capable of agonizing the glucocorticoid receptor, wherein an agent capable of up-regulating CD73 and a glucocorticoid and/or an agent capable of agonizing the glucocorticoid receptor are administered sequentially. An agent capable of up-regulating CD73 is administered prior to a glucocorticoid and/or an agent capable of agonizing the glucocorticoid receptor.

5 Claims, 3 Drawing Sheets

(56) References Cited

OTHER PUBLICATIONS

WHO Solidarity Trial Consortium, "Repurposed Antiviral Drugs for Covid-19—Interim WHO Solidarity Trial Results", NEJM. Dec. 2, 2020, 15 pags.

Kiss et al., "IFN-beta protects from vascular leakage via up-regulation of CD73", Eur J Immunol 37, 3334-3338 (2007).

Cauwels et al., "Extracellular ATP drives systemic inflammation, tissue damage and mortality", Cell Death and Disease, 5, e1102 (2014), 7 pages.

Carlet et al., "Steroids for sepsis and ARDS: this eternal controversy remains with COVID-19", Lancet (2020), vol. 396, Oct. 24, 2020, pp. e61-e62.

Ranieri et al., "Effect of Intravenous Interferon β-1a on Death and Days Free from Mechanical Ventilation Among Patients With Moderate to Severe Acute Respiratory Distress Syndrome, A Randomized Clinical Trial", JAMA (2020), 323(8), pp. 725-773.

Mcnab et al. "Type I interferons in infectious disease", .Nat Rev Immunol 15 (2), pp. 87-103 (2015).

Dosch et al., "Mechanisms of ATP Release by Inflammatory Cells", Int J Mol Sci, 19 (2018), 1222, 16 pgs.

\* cited by examiner

TREATMENT OF DISEASES WITH SEQUENTIAL ADMINISTRATION OF AN AGENT CAPABLE OF UP-REGULATING CD73 AND GLUCOCORTICOIDS

CROSS REFERENCE TO RELATED APPLICATION

This application claims the benefit of Finland Patent Application No. 20215080 filed on Jan. 25, 2021, the disclosure of which is incorporated herein in its entirety by reference.

FIELD OF THE INVENTION

The present invention relates to sequential treatment of an agent capable of up-regulating CD73, such as type I interferons and exogenous glucocorticoids for organ protection in emergency diseases and conditions.

BACKGROUND OF THE INVENTION

Type I Interferons (IFN) and endogenous cortisol are our natural responses to viral insult and stress, respectively. The inability to summon either is deadly with both Addison's disease being the deficiency of cortisol and IFN deficiency being known as a self-titled syndrome. We have now learned that these natural responses need to happen in sequential manner, since endogenous cortisol and given glucocorticoids block type I IFN signalling [1], and if given together, these two agents have shown to increase mortality in patients with acute respiratory distress syndrome (ARDS) [2]. Hence, until now, prior art has learned that type I IFNs and glucocorticoids should not be used together, and there is an on-going scientific debate that which pharmaceutical ingredient, glucocorticoids or type I IFNs, would be better for emergency conditions and systemic inflammatory response, where an anti-inflammatory agent should be given. Now glucocorticoids are standard of care for the treatment of the systemic inflammations attributed to COVID-19 [3], and type I IFNs do not work in this setting [4].

Type I Interferons (IFN) consist of a group of structurally similar cytokines and include 13-14 subtypes of IFN-α along with IFN-β, IFN-ε, IFN-κ, IFN-ω, IFN-δ, IFN-ζ, and IFN-τ. These play a major part of the innate immune system and are highly conserved as part of our natural responses to viral insult and has an anti-viral role in the host defence. These IFN are induced through the anti-viral effector molecules that are encoded by IFN-stimulated genes after type I IFNs have bound to their receptor IFNAR. One of these IFN-stimulated proteins is CD73. CD73 is a crucial enzyme and possibly one of the most conserved enzymes due to its role in the pathway in the metabolism in adenosine triphosphate (ATP) to adenosine. CD73 and CD39 are both involved in the breakdown, however CD73 is the rate limiting enzyme to this metabolism [6].

During the acute phase of viral assault inflammation is part of the disease process and allows for healing. Virally infected cells begin to produce interferons but also send signalling molecules to nearby cells to warn them of viral process [5]. ATP is such a signalling molecule and its role in inflammation has been well established in the literature, during viral assault it is released from stressed cells and functions as both a "danger" and a "find me" signal for neighbouring cells and phagocytes respectively [7].

Extracellular ATP is a key mediator for downstream proinflammatory signalling to begin. Without ATP downstream IL-1, IL-6, IL-10 and TNF are not produced [7]. The ability to release ATP into the extracellular space is crucial for purinergic signalling to begin the process of inflammation and multiple routes for ATP exist to be released. It is necessary to recruit inflammatory cells to the sites of damage and infections however adverse effects can occur if the signalling pathway escalates and ATP is not cleared [8]. The release of IFN from the stressed or dying cell bind to their receptor, IFNAR and allow for the induction of protection CD73 on the endothelial layer which can begin to break down the extracellular ATP to adenosine. Adenosine is a potent anti-inflammatory and organ protective agent [6].

If the initial assault that caused the stress is not resolved, then Systemic Inflammatory Response Syndromes (SIRS) can occur. This occurs from both infection and sterile insults. They are characterised by excessive inflammatory cytokine production and the release of toxic endogenous molecules such as ATP [7], [8]. Whilst these molecules are necessary to resolve the causative agent of the initiation assault however these molecules cause progressively more damage and leads to multiple organ dysfunction syndrome (MODS) and patients succumb to death if the cytokines are not dealt with in due time [8].

For decades in the clinical management of diseases related to SIRS such as Acute Respiratory Distress Syndrome (ARDS) (previously known as Acute Lung Injury (ALI)) and sepsis, glucocorticoids have given controversial results and their use is still an on-going debate [9]. The current SARS-CoV2 viral pandemic, which causes COVID-19 disease that leads to ARDS, has again showed us, that the early use of glucocorticoids in a severe viral respiratory infection is harmful, but late in the disease when excessive inflammation and poor oxygenation prevails glucocorticoids are beneficial [3]. Glucocorticoids are used to suppress the cytokine storm in SIRS and have been used in some patients to produce a mortality benefit. However, type I IFNs are also considered as a viable treatment for COVID-19, MERS, and ARDS [10]. But given together in ARDS and other emergency conditions, the combination of IFN and glucocorticoids has even shown to be harmful [2,10].

SUMMARY OF THE INVENTION

In the pre-clinical work and multiple clinical trials including major ongoing trials for COVID-19 but also clinical trials which have been conducted on the use of Interferon beta (IFN beta) in attempt to induce CD73 for organ protection; these trials include two trials for ARDS (ClinicalTrials.gov; NCT00789685 and NCT02622724) and a trial for the prevention of multiple organ dysfunction syndrome (MODS) after emergency aortic surgery (ClinicalTrials.gov; NCT03119701), have shown that the administration of glucocorticoids in the early phase of the diseases which led to SIRS increases mortality in patients. Especially, it has been found that the simultaneous administration of a glucocorticoid agent and an agent capable of agonizing type I interferon receptor IFNAR for the induction of CD73 transcription for the treatment of diseases characterized by systemic inflammatory response syndrome (SIRS), endothelial dysfunction and capillary leak, has shown an increase in mortality by blocking the induction of CD73 [2]. In the INTEREST Trial (ClinicalTrials.gov; NCT02622724), investigating the use of intravenous IFN beta for the treatment of ARDS, 28-day mortality was significant in patients that received glucocorticoids with IFN beta compared to patients that did not receive steroids, such as glucocorticoids with IFN beta, as previously reported [2]. Now, it has been however found that that mortality was significantly lower if glucocorticoids were used after IFN beta treatment. The 28-day mortality was not increased in patients that first received IFN beta and then glucocorticoids, even though glucocorticoid use overall was associated with worse survival.

Hence, it has been now found that both an agent capable of up-regulating CD73, such as type I interferon for the turnover of ATP into adenosine and a glucocorticoid are needed to be used in a sequential manner for best patient benefit in states of emergency and systemic inflammatory response. This highlights the necessity of administering within the narrow therapeutic window of both therapeutics and provides an insight into the natural pathway of endogenous interferon and cortisol reaction to protect internal organs and vascular system.

The sequencing of these commonplace therapeutics according to the present invention provides a novel treatment regime that could tackle the issues with current problems seen with the prior art including mortality, a need for mechanical ventilation and entrance into the intensive care unit.

Thus, an object of the present invention is to provide a novel treatment strategy for an emergency medicine setting suitable for any indication which induces Systemic Inflammatory Response Syndromes (SIRS) and causes mortality from Multiple Organ Dysfunction Syndrome (MODS).

In order to achieve among others the objects presented above, the invention is characterized by what is presented in the enclosed independent claims. Some preferred embodiments of the invention will be described in the other claims.

The embodiments and advantages mentioned in this text relate, where applicable, both to the sequential of the said agents, the methods as well as to the uses according to the invention, even though it is not always specifically mentioned.

The present invention concerns a combination of therapeutically effective amounts of:
  (a) an agent capable of up-regulating CD73 in an individual, and
  (b) a glucocorticoid and/or an agent capable of agonizing the glucocorticoid receptor,
    for use in a sequenced manner to first induce organ protective elements and then dampen excess inflammation in an individual.

In the present invention, it has been observed that glucocorticoids block the organ protective (CD73 induction) in an individual, but not anti-viral effects (MxA) of type I interferons. Hence, an agent capable of up-regulating CD73, such as type I interferons and/or an interferon receptor (IFNAR) agonist needs to be given first in order induce proper organ protective effects, and only after this induction has happened, can glucocorticoids be administered as an anti-inflammatory agent. This has not been previously understood since type I interferons are considered as anti-virals, and glucocorticoids do not affect the measurable anti-viral effects, such as MxA, of type I IFNs. It has now been shown that although glucocorticoids do not interfere with the anti-viral properties of type I interferons, they do significantly interfere with the organ protective effects of type I interferons.

The present invention provides a sequenced treatment method of an agent capable of up-regulating CD73 for the turnover of ATP into adenosine and a glucocorticoid and/or a glucocorticoid receptor agonist for patients with an emergency condition that leads to SIRS and MODS. Hence, according to one aspect of the present invention an agent capable of up-regulating CD73 in an individual is used in a method of preventing and/or treating of systemic inflammatory response syndrome (SIRS) and/or to multiple organ dysfunction syndrome (MODS) in combination with a glucocorticoid, characterized in that an agent capable of up-regulating CD73 and a glucocorticoid and/or an agent capable of agonizing the glucocorticoid receptor are administered sequentially, wherein an agent capable of up-regulating CD73 is administered prior to a glucocorticoid and/or an agent capable of agonizing the glucocorticoid receptor.

The present invention provides a method for preventing the onset of SIRS and/or treating SIRS and/or preventing leading to MODS in an individual comprising administering to the individual a therapeutically effective amount of an agent capable of up-regulating CD73 in sequential treatment with a glucocorticoid and/or an agent capable of agonizing the glucocorticoid receptor, wherein an agent capable of up-regulating CD73 is administered prior to a glucocorticoid and/or an agent capable of agonizing the glucocorticoid receptor. According to a preferred embodiment of the present invention an administration of a glucocorticoid and/or an agent capable of agonizing the glucocorticoid receptor is started after CD73 induction has been achieved. In a preferred embodiment, a glucocorticoid and/or an agent capable of agonizing the glucocorticoid receptor should not be administered before the induction of CD73 has been achieved, and once CD73 induction has been achieved the treatment with an agent capable of up-regulating CD73 should end. According to a preferred embodiment of the present invention an agent capable of up-regulating CD73 is not administered simultaneously with and a glucocorticoid and/or an agent capable of agonizing the glucocorticoid receptor.

A combination of an agent capable of up-regulating to CD73 and in sequential treatment with a glucocorticoid has been shown to associate with lower mortality compared to the treatments used together. According to the present invention an agent capable of up-regulating to CD73 should be administered in the acute phase of the disease to prevent SIRS to protect organs through the upregulation of CD73, and sequential treatment with a glucocorticoid in the chronic phase of the disease.

The present invention can be utilized in the treatment of diseases and/or conditions and for emergency medical conditions which could led to SIRS and MODS. The present invention is applicable treatment method to all forms of diseases which may lead to SIRS. SIRS may be caused by both infection assaults and sterile insults. Examples of infections assaults could include viruses such as SARS-CoV2 and influenza, but all micro-organisms can cause SIRS. Sterile insults could be trauma, burns, surgery or ischemia-reperfusion injury. This list is not exhaustive, but the present invention encompasses any insult that can led to SIRS. SIRS is typically characterised by excessive inflammatory cytokine production and the release of toxic endogenous molecules, such as ATP. SIRS may be led to vascular dysfunction, capillary leak and thrombosis leading to life-threatening multiple organ dysfunction syndrome (MODS).

DESCRIPTION OF THE DRAWINGS

The following Figures show CD73 (organ protective) and MxA (anti-viral) responses in patients treated with intravenous interferon beta for the prevention of SIRS leading to MODS, and death that have survived emergency aortic surgery (ClinicalTrials.gov; NCT03119701). More detailed.

DETAILED DESCRIPTION OF THE INVENTION

Figure 1:
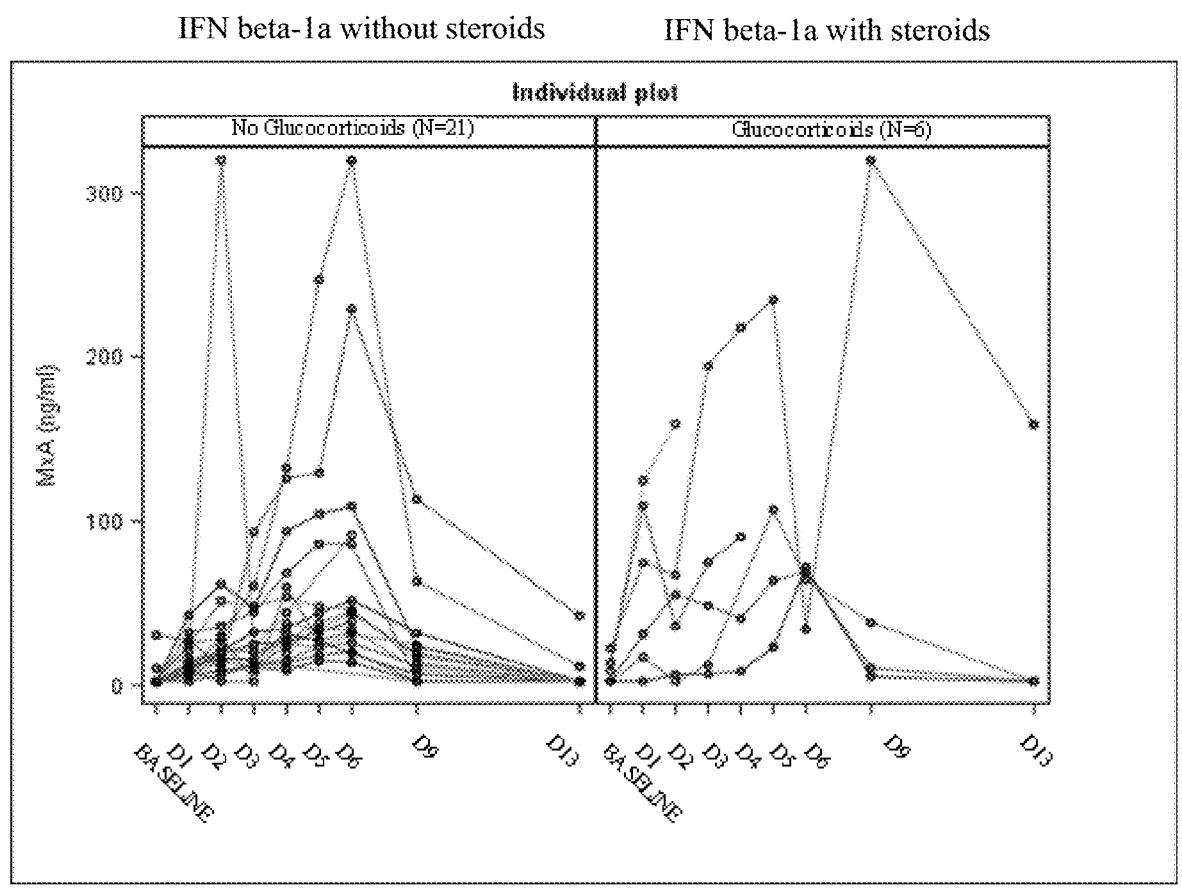
FIG. 1 shows that there is an up-regulation of MxA (myxovirus resistance protein A) observed in all patients with or without simultaneous administration of steroids, such as a glucocorticoid. MxA is a classical pharmacodynamic marker for IFN beta drug activity, but it only measures anti-viral activity.

In the present invention, the term "an agent capable of up-regulating CD73" refers to any suitable agent which can achieve the conversion of ATP into adenosine. The CD73, an endothelial ectoenzyme, which can produce local adenosine, is a key molecule to maintain endothelial barrier and lung function. Up-regulation CD73 expression is required in increasing local adenosine. It is known that type I interferon increases CD73 expression resulting in increased local adenosine. Many inflammatory conditions are known to result in the loss of CD73 from the surfaces of inflamed/injured endothelial cells, therefore reducing available clearance of pro-inflammatory ATP into anti-inflammatory adenosine.

According to an embodiment of the present invention an agent capable of up-regulating CD73 comprises type I interferon(s) and/or fragments thereof, and/or an antibody and/or a fragment thereof, peptide(s) or macromolecule capable of up-regulating CD73 and any combination thereof. According to an embodiment of the present invention, an agent capable of up-regulating CD73 may be any antibody and/or a fragment thereof, peptide(s) and/or macromolecule which binds to the receptor IFNAR inducing CD73. The antibody may be a chimeric, humanized or monoclonal antibody or any fragment or any molecule thereof. According to another embodiment of the present invention, an agent capable of up-regulating CD73 may also be any other pharmacological agent that can up-regulate the clearance of ATP into adenosine in circulation. In an embodiment of the invention, an agent capable of capable of up-regulating CD73 and/or an agent capable of clearance of ATP into adenosine are used in sequential treatment with a glucocorticoid and/or an agent capable of agonizing the glucocorticoid receptor.

According to an embodiment of the present invention, an agent capable of capable of up-regulating CD73 comprises an exogenous type I interferon or an agent capable of inducing similar effects. According to the present invention an exogenous type I interferon comprises interferon beta, interferon alpha and/or any subtypes of them. In an embodiment of the present invention, an agent capable of up-regulating CD73 comprises interferon beta. According to an embodiment of the present invention an exogenous type I interferon may be interferon beta-1a and/or interferon beta-1b. In an embodiment according to the present invention type I interferon comprises interferon beta-1a. According to the present invention type I interferon is selected on the basis of the required treatment. In an exemplary embodiment according to the invention, type I interferon may be selected any current developmental assets, for example Rebif (Merck and Co) comprising interferon beta-1a, Avonex (Biogen) comprising interferon beta-1a, Betaseron (Bayer) comprising interferon beta-1b and Traumakine (Faron Pharmaceuticals Oy) comprising interferon beta-1a, or any combination thereof. These type I IFN drug products are only examples of currently disclosed and known development type I IFN agonists, the present invention is not limited to these.

In the present invention, a glucocorticoid refers to an agent capable of binding to glucocorticoid receptor (NR3C1). In an embodiment according to the invention, a glucocorticoid comprises hydrocortisone, prednisone, prednisolone, methylprednisolone, betametatsone and/or dexamethasone. According to an embodiment of the present invention any agent capable of agonizing the glucocorticoid receptor (a glucocorticoid receptor agonist) can be administered in sequentially with an agent capable of up-regulating CD73, such as type I interferon(s). This list is not an exhaustive list of all available glucocorticoids and the present invention could embody any of the current developmental and marketed agents in this class of drugs.

According to the present invention an agent capable of up-regulating to CD73 and a glucocorticoid and/or an agent capable of agonizing the glucocorticoid receptor are administered sequentially, wherein an agent capable of up-regulating to CD73 is administered prior to a glucocorticoid and/or an agent capable of agonizing the glucocorticoid receptor. According to an embodiment of the present invention, an agent capable of up-regulating CD73 is administered at least 3 days prior to a glucocorticoid and/or an agent capable of agonizing the glucocorticoid receptor, typically an agent capable of up-regulating CD73 is administered at 3-7 days prior to start an administration of a glucocorticoid and/or an agent capable of agonizing the glucocorticoid receptor. It has been observed that CD73 induction has typically been achieved after 3 days of the first administration of an agent capable of up-regulating CD73, such as type I interferon. In an embodiment according to the present invention, an agent capable of up-regulating CD73, such as type I interferon is administered at least 3 consecutive days, typically at 3-7 consecutive days prior to start an administration of a glucocorticoid and/or an agent capable of agonizing the glucocorticoid receptor. In an exemplary embodiment, an agent capable of up-regulating CD73, such as type I interferon is administered once a day. In an exemplary embodiment of the present invention, an agent capable of up-regulating to CD73 is administered first for up to 3-7 consecutive days followed by a glucocorticoid and/or an agent capable of agonizing the glucocorticoid receptor for the remained of the treatment period. According to the present invention, an agent capable of up-regulating CD73 is not administered simultaneously with a glucocorticoid and/or an agent capable of agonizing the glucocorticoid receptor. An administration of an agent capable of up-regulating CD73 is ended prior to a start of the administration of a glucocorticoid and/or an agent capable of agonizing the glucocorticoid receptor.

In an embodiment of the present invention, a glucocorticoid and/or an agent capable of agonizing the glucocorticoid receptor administration is started after the induction of CD73 has been achieved. In other words, the patient must be firstly treated with an agent capable of inducing CD73 alone and after notifying the desired treatment response, the treatment by administering a glucocorticoid and/or agent agonizing the glucocorticoid receptor alone, without an agent capable of inducing CD73 agent(s), is started.

An agent capable of up-regulating to CD73, and a glucocorticoid and/or an agent agonizing the glucocorticoid receptor are administered therapeutically effective amount, which is meant to include any amount of an agent according to the present invention that is sufficient to bring about a desired therapeutic result. The dose chosen should be sufficient to in the case of an agent capable of inducing CD73 to CD73 induction and a glucocorticoid and/or an agent agonizing should suppress the cytokine storm.

In the present invention, an agent capable of up-regulating to CD73 and a glucocorticoid and/or an agent agonizing the glucocorticoid receptor can be administered using any of the various methods and delivery systems known to those skilled in the art. The agents to be used in the present invention may be administered by any means that achieve their intended purpose. For example, administration may be intravenous, intramuscular, intraperitoneal, subcutaneous or other parenteral routes of administration, for example by injection as well as to include inhalation via intubation or nebulizer for example. In addition to the pharmacologically active compounds, the pharmaceutical preparations of said agents preferably contain suitable pharmaceutically acceptable carriers comprising excipients and auxiliaries that facilitate processing of the active agents into preparations that can be used pharmaceutically.

According to a preferred embodiment of the present invention, an agent capable of up-regulating CD73 is administered intravenously. In an exemplary embodiment, type I interferon, such as interferon beta-1a is administered intravenously. Intravenous administered interferon, such as interferon beta-1a maximise bioavailability of the drug in circulation and on the endothelium where it is taken up by its receptor IFNAR. Via intramuscular or subcutaneous administration type I IFN serum concentration do not reach adequate levels to induce the protein transcription of CD73 on the endothelium.

According to an embodiment of the invention, a method of preventing the onset of SIRS and/or treating SIRS which leads to MODS comprises administering in sequential to an individual, therapeutically effective amounts of:
  (a) an agent capable of up-regulating to CD73, and
  (b) a glucocorticoid and/or agent agonizing the glucocorticoid receptor, to first induce organ protective elements and then dampen excess inflammation.

In an embodiment of the present invention, a method for prevention and/or treating of SIRS and MODS comprises
  administering a therapeutically effective amount of an agent capable of up-regulating to CD73,
  monitoring CD73 up-regulation, and
  administering a therapeutically effective amount of a glucocorticoid and/or agent agonizing the glucocorticoid receptor after CD73 induction has been achieved.

According to a preferred embodiment of the present invention a glucocorticoid administration is started after CD73 induction has been achieved and thus the administration of an agent capable of up-regulating to CD73 has been ended. An up-regulation of CD73 can be monitored by measuring CD73 levels from the patient and comparing the measured values to the values measured from said patient prior to the starting of administering an agent capable of up-regulating to CD73, such as IFN treatment and/or to the values of the previous measurement(s) during said treatment. In a preferred embodiment, a glucocorticoid should not be administered before the induction of CD73 has been achieved, and once CD73 induction has been achieved the treatment with an agent capable of up-regulating CD73 should end. According to a preferred embodiment of the present invention an agent capable of up-regulating CD73 and a glucocorticoid are not administered simultaneously.

In treatment methods according to the present invention, also any other anticytokine inhibitory agents may be used in addition to a glucocorticoid.

According to the present invention, an administration of therapeutically effective amounts of an agent capable of up-regulating CD73, followed by an administration of therapeutically effective amounts of glucocorticoid and/or agent agonizing the glucocorticoid receptor after CD73 induction has been achieved can be used in treatment of any diseases and/or conditions and for an emergency medical condition which leads to SIRS, ARDS and MODS. The term "treatment" or "treating" shall be understood to include the prevention of a disease or disorder, as well as amelioration or alleviation of said disease or disorder. If the patient has progressed into MODS a glucocorticoid and/or a glucocorticoid receptor agonist alone is likely to a better treatment and IFNAR agonist is not likely needed.

The present invention is applicable treatment method to all forms of diseases and/or conditions leading to SIRS. An emergency medical condition or critical diseases and/or conditions which can led to systemic inflammatory response syndrome is including of diseases both infections and sterile insults. Infectious diseases may include both viral and bacterial infections. Examples of infections assaults could include viruses, such as SARS-CoV2 and influenza, but all micro-organisms can cause SIRS. Infectious disease may be influenza or coronavirus infection leading to SIRS, ARDS and MODS, but also other severe life-threatening viral infections. Sterile insults leading to inflammation comprises trauma, burns, surgery and ischemic reperfusion injury. These are examples of diseases but not limited to these. The present invention encompasses any insult that can led to SIRS. SIRS is characterised by excessive inflammatory cytokine production and the release of toxic endogenous molecules, such as ATP. SIRS may be led to vascular dysfunction, capillary leak and thrombosis leading to life-threatening multiple organ dysfunction syndrome (MODS). Hence, the present invention may be used in the prevention and/or treatment of vascular-endothelial diseases in humans with sepsis, severe acute viral infections, humans undergoing major cardiovascular surgery leading to ischemia-reperfusion injury, and disease states referred to as acute kidney injury (AKI), acute respiratory distress syndrome (ARDS) and/or multi-organ failure (MOF). The present may also be suitable for the treatment of multiple sclerosis MS. Further, the sequential treatment according to the present invention can be used in the prevention and/or treatment of malignant diseases in humans comprising hairy cell leukaemia, malignant melanoma, follicular lymphoma, condylomata acuminate, AIDS related Kaposi's Sarcoma, chronic hepatitis C, acute hepatitis C, and chronic hepatitis B.

The treatment method of the present invention is also suitable for use in the prevention and/or treatment of ischemia-reperfusion injury resulting from vascular or cardiac surgery, organ transplantation, stroke, myocardial infarction or acute coronary syndrome, or for use in ischemic pre-conditioning prior to major vascular or cardiac surgery and organ transplantation. In addition, the invention is suitable for use in the prevention and/or treatment of ischemia-reperfusion injury in myocardial infarction and stroke.

According to an embodiment of the present invention, said sequential combination treatment can be used for treatment and/or prevention of a disease and/or condition leading to a systemic inflammatory response syndrome (SIRS) selected from the group consisting of infectious diseases, chronic infection(s), severe viral or bacterial infection(s), severe bacterial pneumonia, sepsis and traumatic condition (s). According to the present invention, diseases or conditions related to SIRS also comprise Acute Respiratory Distress Syndrome (ARDS) and Acute Lung Injury (ALI).

According to an embodiment of the invention, the disease or the disorder requiring or beneficiating from the treatment of the present invention may be selected from vascular-endothelial diseases, acute respiratory distress syndrome (ARDS) or other traumatic conditions, ischemia-reperfusion injury, ischemic pre-conditioning prior to major vascular or cardiac surgery and organ transplantation, acute pancreatitis, acute kidney injury, multi-organ failure (MOF), severe respiratory or haemorrhagic viral infections, and multiple sclerosis (MS).

The sequential treatment according to the present invention in a prevention or treatment of SIRS is characterized by reducing endothelial inflammation, endothelial dysfunction, capillary leak and microvascular thrombosis.

According to one aspect, the present invention may be useful for infectious insults which are not responsive to standard regime anti-virals and/or shown only limited responsiveness to these anti-viral inhibitors.

EXPERIMENTAL

In a clinical trial for the prevention of MODS after emergency aortic surgery (ClinicalTrials.gov; NCT03119701: Efficacy and Safety of FP-1201-Iyo (Interferon Beta-1a) in Prevention of Multi-Organ Failure on Patients After Open Surgery for a RAAA (INFORAAA)), 10 µg of interferon beta-1a or placebo has been intravenously administered to the patients with or without steroids, such as glucocorticoids, for up to 6 days every 24 hours. FP-1201-Iyo (Traumakine, Faron Pharmaceuticals Oy) comprises interferon beta-1a as an active ingredient.

Figure 2:
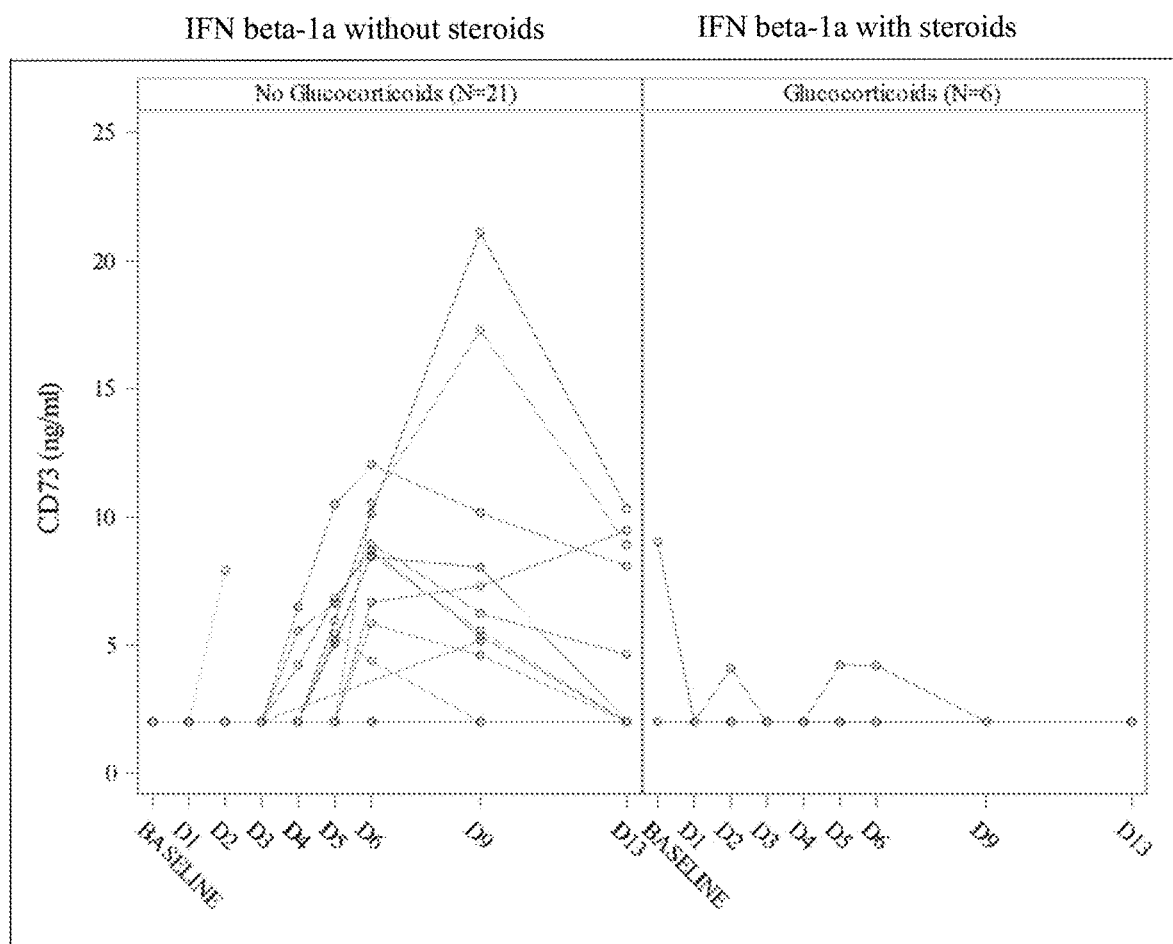
FIG. 2 shows that there is no up-regulation of CD73 when interferon beta (IFN beta-1a) is used with steroids, such as glucocorticoids.
Figure 3:
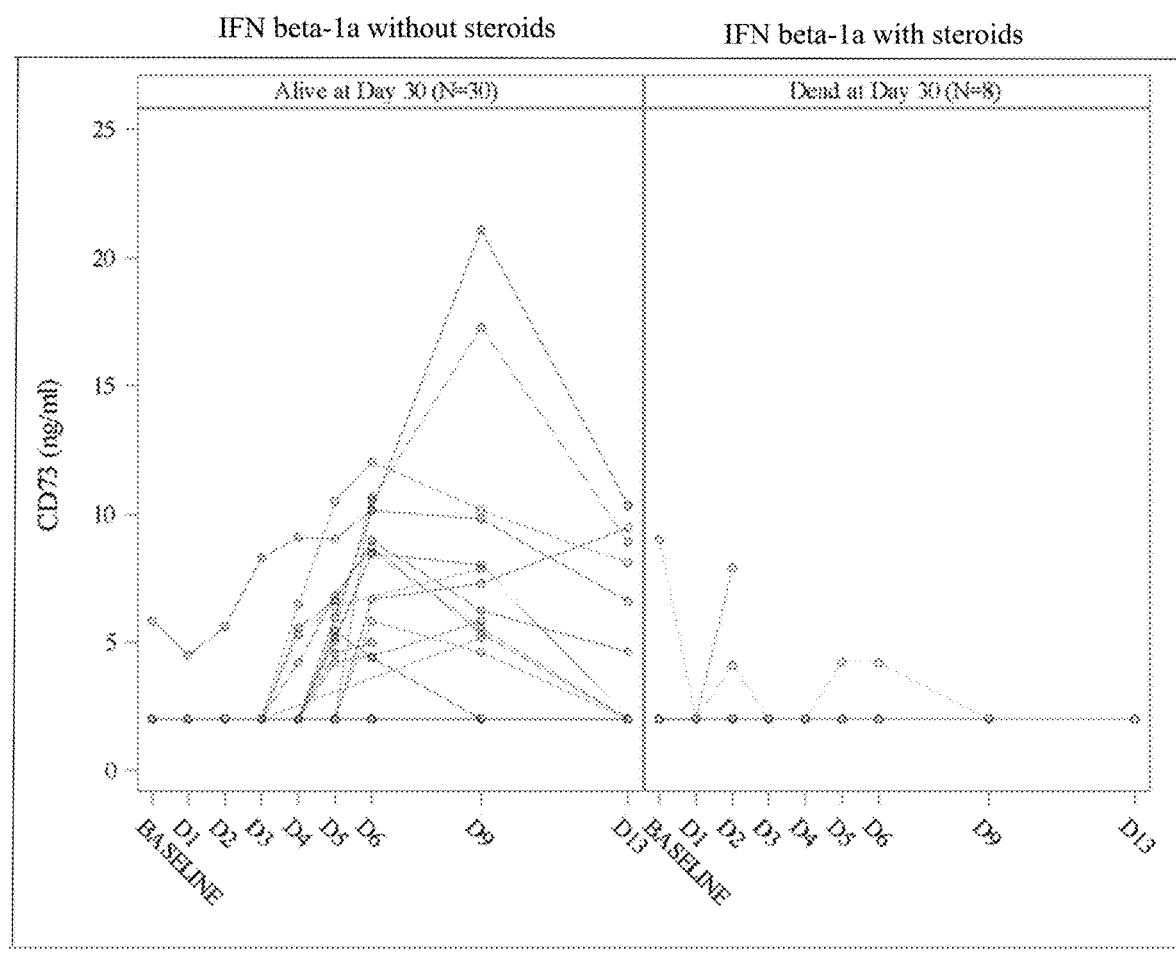
FIG. 3 shows that CD73 response is required for survival.

FIGS. 1 and 2 show an up-regulation of MxA (myxovirus resistance protein A) and CD73 during the trial presented as the individual plots for each patient. CD73 responses/induction was often observed after 3 consecutive days of IFN beta-1a administration, sometimes longer administration was needed. FIG. 3 shows that CD73 response is required for survival. FIG. 3 includes also patients treated with placebo.

From FIGS. 1 and 2, it can be concluded that glucocorticoids do not block the anti-viral properties (MxA) of IFN beta to the same extent as the organ protective properties (CD73) in patients treated with intravenous IFN beta. FIG. 2 shows that glucocorticoids block the organ protective (CD73) but from FIG. 1, it can be seen that anti-viral effects (MxA) of type I IFNs have not been blocked. Hence, type I IFNs or an interferon receptor (IFNAR) agonist needs to be given first in order induce proper organ protective effects, and only after this induction has happened, can glucocorticoids be administered as an anti-inflammatory agent.

CITED REFERENCES

1. J. R. Flammer et al., The type I interferon signaling pathway is a target for glucocorticoid inhibition. Mol Cell Biol 30, 4564-4574 (2010).
2. J. Jalkanen, V. Pettilä, T. Huttunen, M. Hollmén, S. Jalkanen, Glucocorticoids inhibit type I IFN beta signaling and the upregulation of CD73 in human lung. Intensive Care Med (2020).
3. J. Sterne et al. Association Between Administration of Systemic Corticosteroids and Mortality Among Critically Ill Patients With COVID-19: A Meta-analysis. JAMA. September 2020
4. WHO Solidarity Trial Consortium. Repurposed Antiviral Drugs for Covid-19—Interim WHO Solidarity Trial Results. NEJM Dec. 2, 2020.
5. F. McNab, K. Mayer-Barber, A. Sher, A. Wack, A. O'Garra, Type I interferons in infectious disease. Nat Rev Immunol 15, 87-103 (2015).
6. J. Kiss et al., IFN-beta protects from vascular leakage via up-regulation of CD73. Eur J Immunol 37, 3334-3338 (2007).
7. M. Dosch, J. Gerber, F. Jebbawi, G. Beldi, Mechanisms of ATP Release by Inflammatory Cells. Int J Mol Sci 19 (2018).
8. A. Cauwels, E. Rogge, B. Vandendriessche, S. Shiva, P. Brouckaert, Extracellular ATP drives systemic inflammation, tissue damage and mortality. Cell Death Dis 5, e1102 (2014).
9. J. Carlet, D. Payen, S. M. Opal, Steroids for sepsis and ARDS: this eternal controversy remains with COVID-19. Lancet (2020).
10. V. M. Ranieri et al., Effect of Intravenous Interferon β-1a on Death and Days Free from Mechanical Ventilation Among Patients With Moderate to Severe Acute Respiratory Distress Syndrome: A Randomized Clinical Trial. JAMA (2020).

The invention claimed is:

1. A method of treating a subject suffering from systemic inflammatory response syndrome (SIRS) and/or multiple organ dysfunction syndrome (MODS), comprising administering interferon beta-1a (IFNβ-1a) in combination with a glucocorticoid to the subject, wherein the IFNβ-1a and the glucocorticoid are administered sequentially, and the IFNβ-1a is administered at 3-7 consecutive days prior to the start of administration of the glucocorticoid.

2. The method according to claim 1, wherein the glucocorticoid comprises hydrocortisone, prednisone, prednisolone, methylprednisolone, betametatsone and/or dexamethasone.

3. The method according to claim 1, wherein the glucocorticoid is administered after an increase in CD73 level has been observed.

4. The method according to claim 1, wherein the IFNβ-1a is administered intravenously.

5. The method according to claim 1, wherein the subject is suffering from MODS.

* * * * *